No. 641,727. Patented Jan. 23, 1900.
P. ROBERTSON & C. MATSON.
GASOLENE ENGINE.
(Application filed Apr. 10, 1899.)
(No Model.) 5 Sheets—Sheet 1.

Witnesses
Geo. W. Young.
N. E. Oliphant.

Inventors
Peter Robertson
Christ Matson
By H. G. Underwood
Attorneys

No. 641,727. Patented Jan. 23, 1900.
P. ROBERTSON & C. MATSON.
GASOLENE ENGINE.
(Application filed Apr. 10, 1899.)
(No Model.) 5 Sheets—Sheet 2.

No. 641,727. Patented Jan. 23, 1900.
P. ROBERTSON & C. MATSON.
GASOLENE ENGINE.
(Application filed Apr. 10, 1899.)

(No Model.) 5 Sheets—Sheet 3.

Witnesses:
Geo. W. Young.
N. E. Oliphant

Inventors:
Peter Robertson
Christ Matson
By H. G. Underwood
A. Norwey

No. 641,727. Patented Jan. 23, 1900.
P. ROBERTSON & C. MATSON.
GASOLENE ENGINE.
(Application filed Apr. 10, 1899.)
(No Model.) 5 Sheets—Sheet 4.
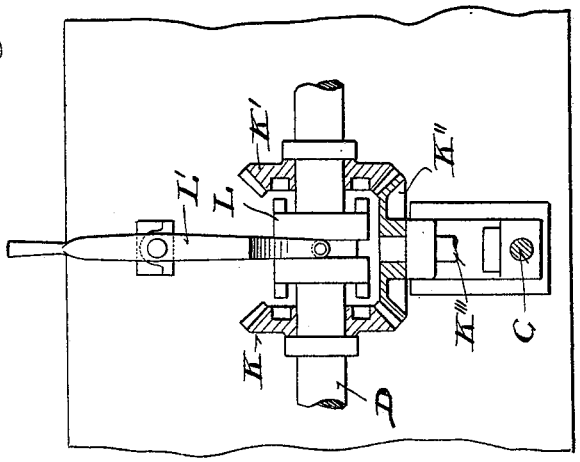
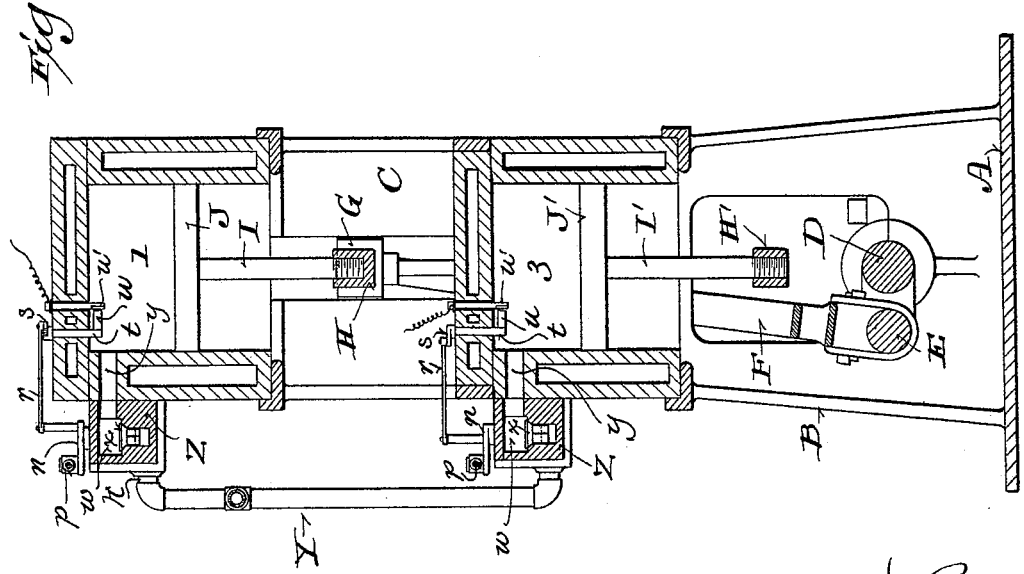
Witnesses:
Geo. W. Truny.
N. E. Oliphant
Inventors
Peter Robertson,
Christ Matson,
By H. G. Underwood
Attorney No. 641,727. Patented Jan. 23, 1900.
P. ROBERTSON & C. MATSON.
GASOLENE ENGINE.
(Application filed Apr. 10, 1899.)
(No Model.) 5 Sheets—Sheet 5.
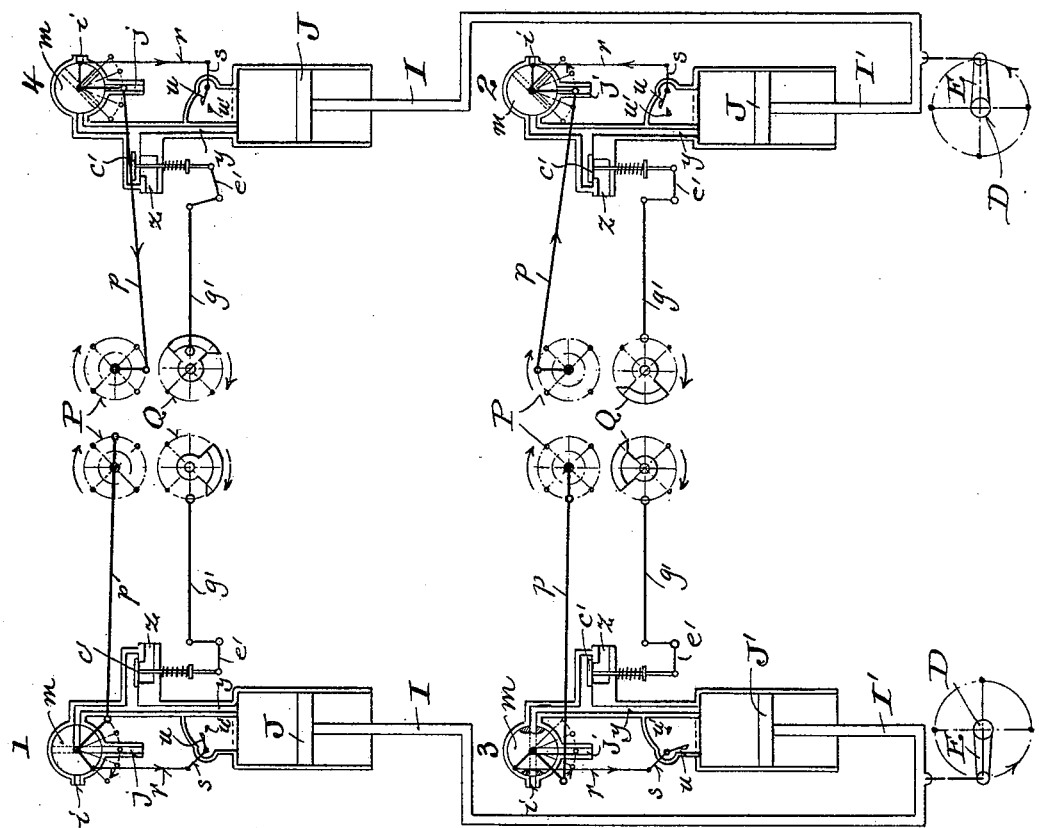
Witnesses:
Geo. W. Young,
N. E. Oliphant
Inventors:
Peter Robertson,
Christ Matson,
By H. G. Underwood
Worner

UNITED STATES PATENT OFFICE.

PETER ROBERTSON AND CHRIST MATSON, OF RACINE, WISCONSIN.

GASOLENE-ENGINE.

SPECIFICATION forming part of Letters Patent No. 641,727, dated January 23, 1900.

Application filed April 10, 1899. Serial No. 712,396. (No model.)

*To all whom it may concern:*

Be it known that we, PETER ROBERTSON and CHRIST MATSON, citizens of the United States, and residents of Racine, in the county of Racine and State of Wisconsin, have invented certain new and useful Improvements in Gasolene-Engines; and we do hereby declare that the following is a full, clear, and exact description thereof.

Our invention has for its object to provide simple, economical, and efficient gasolene-engines especially designed for marine use.

Therefore said invention consists in certain peculiarities of construction and combination of parts hereinafter set forth with reference to the accompanying drawings and subsequently claimed.

Figure 1:
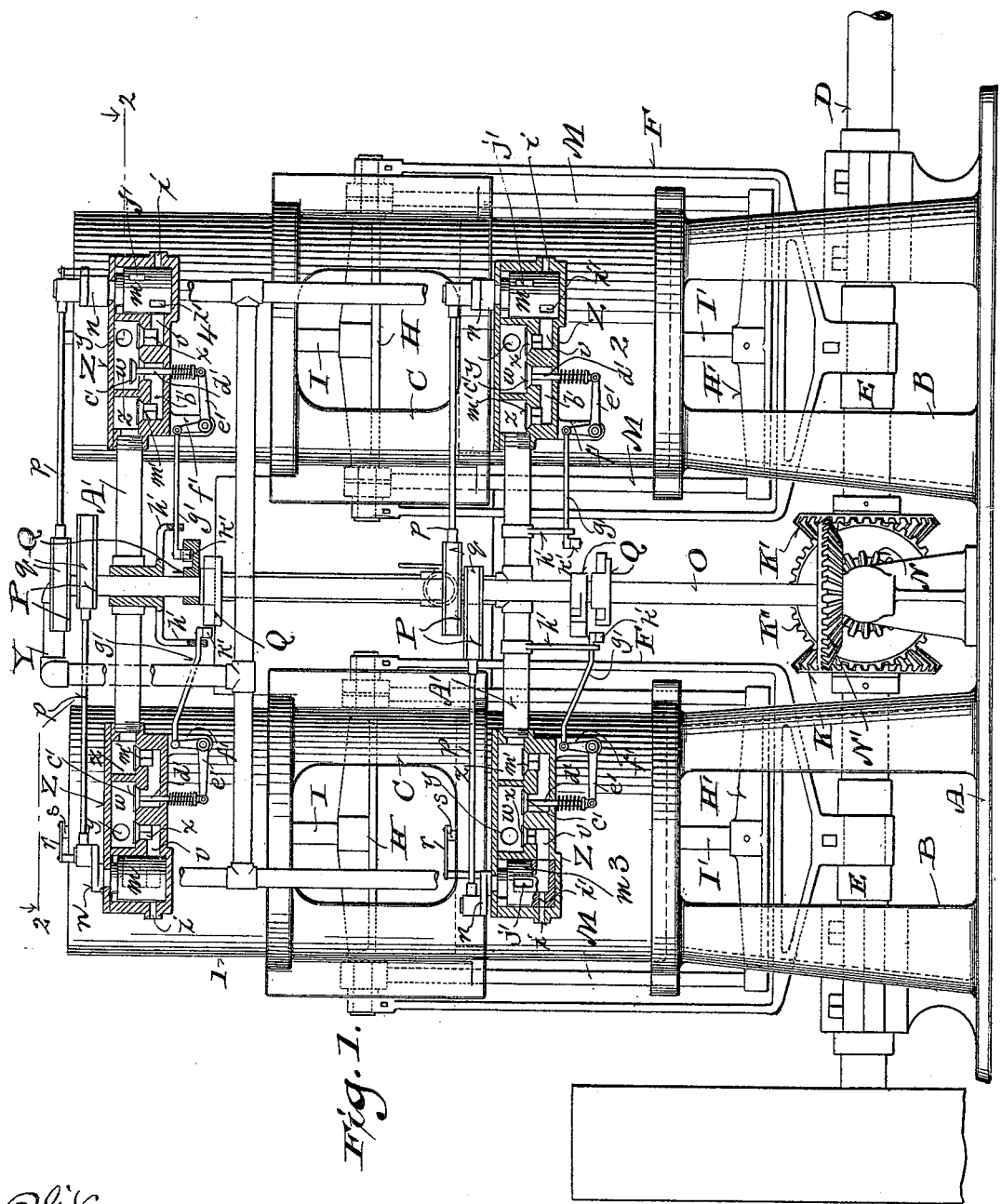
Figure 2:
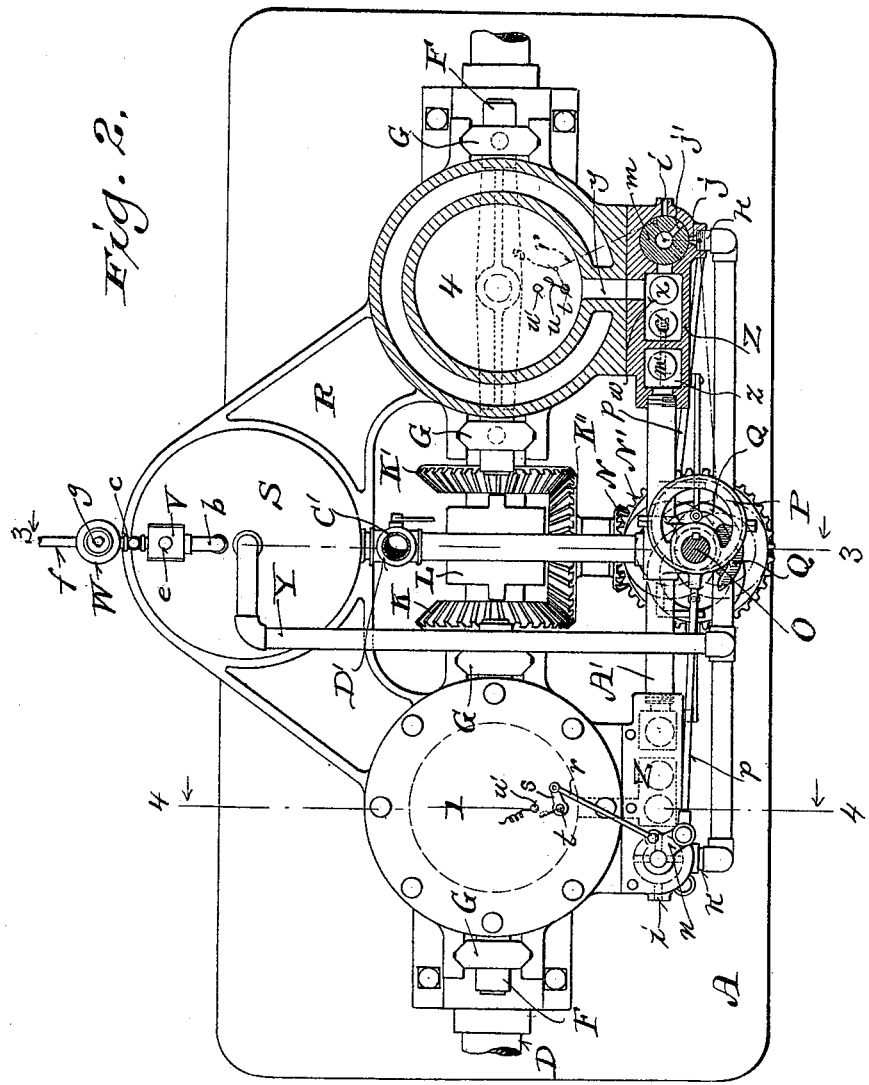
Figure 3:
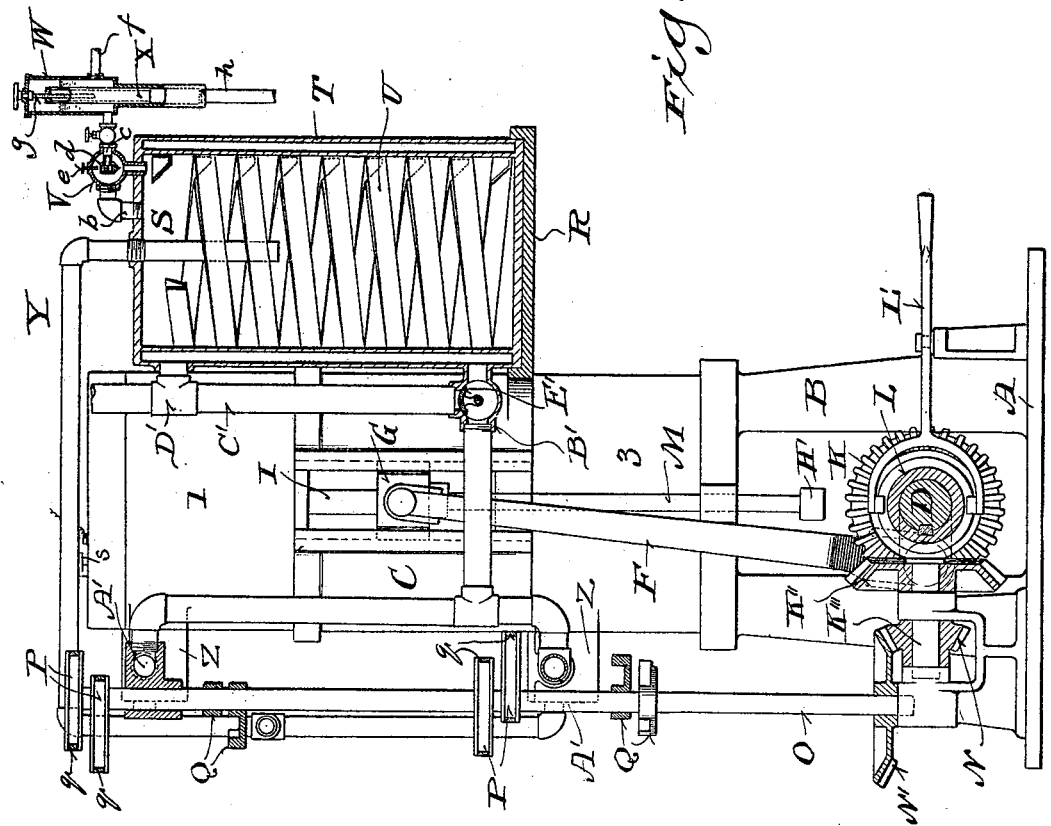

Figure 1 of the drawings represents a front elevation of a gasolene-engine embodying our improvements; Fig. 2, a plan view of same, partly in horizontal section, as indicated by lines 2 2 in the preceding figure; Figs. 3 and 4, vertical transverse sections, respectively indicated by lines 3 3 and 4 4 in the second figure; Fig. 5, a detail plan view, partly in section, illustrating crank-shaft reverse mechanism; and Fig. 6, a diagram illustrating the operation of the engine.

Referring by letters and numerals to the drawings, A indicates a base provided with a pair of stands B for the support of cylinders that in turn support spacing-shells C upon which other cylinders are mounted, the several cylinders being designated by the numerals 1 2 3 4. The base is also provided with bearings for a shaft D, having a fly-wheel and cranks E, the latter being coupled to yokes F, pivotally hung from cross-heads G at the ends of bars H, joined to rods I of pistons J in the upper cylinders, the spacing-shells C being provided with guides for the cross-heads and vertically slotted to accommodate said bars. Rods M connect the bars H with other bars H', joined to the rods I' of pistons J' in the lower cylinders. Therefore it will be understood that each upper piston is paired with a lower piston, and the cranks E of shaft D are so set that when the pistons of one pair are on downstroke those of the other pair are on upstroke.

Loose on the crank-shaft are miter gear-wheels K K', and splined on said shaft between these wheels is a clutch-sleeve L, engageable with either of said wheels, accordingly as it may be shifted by a lever L' in spanner connection therewith, this lever being in pivotal connection with a vertical lug on the engine-base. As shown in Fig. 5, the miter-wheels are made with sockets for engagement with the clutch-teeth of sleeve L, and meshed with said wheels is a similar wheel K'', fast on an arbor K''', for which the engine-base is provided with bearings. A bevel-pinion N, fast on the arbor K''', meshes with a bevel gear-wheel N', fast on the lower end of a vertical shaft O, stepped in a support on the engine-base and having its upper bearing in a coupling-block that constitutes part of a stem of piping for exhaust from all the aforesaid cylinders. Fast on shaft O are eccentrics P and cams Q, there being one of each as part of the valve-gear pertaining to each cylinder of the engine.

In connection with the spacing-shells C above specified is a support R for a generator, comprising an inner chamber S, outer jacket T, and a spiral gutter U in the chamber. Fitted in the upper head of the generator is the hollow shank of a shell V, this shank being immediately over the upper end of the spiral gutter U, and clear of said gutter is an elbow $b$, connecting the chamber S and said shell. Within shell V is the vertical orifice of a cock-controlled feed-tube $c$, leading from a gasolene-receptacle W, and said orifice is controlled by a check-valve $d$, limited as to upward movement by a screw $e$, adjustable in the top of said shell.

The gasolene-receptacle is supplied through a pipe $f$ from a distant tank, and in telescopic union with a depending shank of said receptacle is a tube X, having upper orifices, the elevation of the tube in the aforesaid receptacle being regulated by an adjusting-screw $g$, as is clearly shown in Fig. 3. The elevation of tube X governs hydrostatic pressure of the gasolene in receptacle W, and a pipe $h$, coupled to the depending shank of said receptacle, carries off the gasolene escaping through the upper orifices in said tube. The hydrostatic pressure in receptacle W, operating on check-valve $d$, is counteracted by gas-pressure in the generator-chamber S, and thus the feed of gasolene to the spiral gutter in said chamber is automatically controlled, the valve being seated or unseated accordingly as one of the pressures is at any time in excess of the other when the feed-tube $c$ is open, it being understood that said gasolene is converted into vapor under the influence of heat as it descends said gutter, the length of this gutter being such as to insure the conversion.

Gasolene-vapor escapes from the generator through a pipe Y, constituting part of a system of piping in union with the valve-chests Z of the several cylinders of the engine, these valve-chests and ports in connection therewith being similar throughout the series. Each valve-chest is provided with a compartment having an air-port $i$ and a gas-port $j$, the latter being open to a branch $k$ of the system of which pipe Y forms a part. Loose in said compartment of each valve-chest is a partly-hollow cylindrical valve $m$, provided with ports $i'j'$, that come in and out of register with the aforesaid air and gas ports. The stem of each valve $m$ extends outside the chest and is provided with a crank $n$, connected by a rod $p$ with the ring $q$ around one of the eccentrics P above specified. This crank is also connected by a link $r$ with another crank $s$ on the outer end of a stem $t$, that turns in the upper head of the cylinder with which the valve-chest is connected, and fast to the inner end of the latter stem is a spring-arm $u$, constituting a closer for an electric circuit, of which a contact-point $u'$ within the cylinder forms a part, the spring-arm being insulated on one side, so as to prevent sparking in both directions of its oscillation.

Leading from the chest-compartment containing valve $m$ is a passage $v$, communicating with another compartment $w$ in said chest. This passage is governed by a check-valve $x$, and a port $y$ establishes communication between chest-compartment $w$ and the adjacent cylinder. Between the compartment $w$ and another compartment $z$ of the chest is a passage $b'$, and the extremity of the latter passage within the confines of compartment $w$ is governed by an exhaust-valve $c'$, having its stem $d'$ in connection with one arm of a bell-crank $e'$, that plays on a stud of a bracket $f'$, depending from said chest, a spiral spring being arranged under tension around said stem between a lower collar of the same and the aforesaid chest. The other arm of the bell-crank is pivotally connected at one end of a rod $g'$, loose in a conveniently-arranged guide-bracket $h'$, and an antifriction-roller $k'$ on a projection at the other end of the rod is in position to be operated upon by one of the cams Q above specified.

The extremity of passage $b'$ within the confines of chest-compartment $z$ is governed by a check-valve $m'$, and said compartment is in communication with a branch A' of a system of piping that involves the coupling-block in which the shaft O has its upper bearing, this system of piping being common to all the cylinders as a conveyer for exhaust from the same. This system of piping is joined by a valve-controlled coupling B' with the lower portion of jacket T, constituting part of the generator, and a vertical branch C' of the same system is fitted to the coupling and provided with a branch D' in union with the upper portion of said jacket. As shown in Fig. 3, the valve E' in coupling B' may be turned to close pipe branch C' and make said coupling full open to the space between the chamber S and jacket T of the generator, whereby all the exhaust from the engine will have passage in said space on the way to atmosphere and serve as the means of heating said generator. It also follows that the valve may be turned to cut off a portion or all of the exhaust from the generator in case the latter becomes too hot.

The operation of the engine will be best understood by especial reference to the diagram Fig. 6, assumption being had that explosion has just taken place in cylinder 1 and that the sleeve L, splined on the crank-shaft, is in clutch with one or the other of the miter gear-wheels K K', whereby rotaion is imparted to the miter gear-wheel K'' and valve-gear shaft O, to which it is rigidly connected. Explosion having taken place in cylinder 1, one pair of coupled pistons J J' are on downstroke to drive the crank-shaft and the other pair of coupled pistons are on upstroke incidental to the revolution of said shaft, the valve-gear being timed so that cylinder 3 is open to an inflow of air and gasolene-vapor, cylinders 1 and 2 cut off, and cylinder 4 open to exhaust. Therefore while gas is expanding in cylinder 1 there is compression of gas in cylinder 2, the igniting mechanism being so timed that the next explosion takes place in said cylinder 2 and thereafter in the successive order of said cylinders. The valve-gear with which the igniting mechanism is connected is so timed that while shaft O is making a full-revolution there will be explosion, exhaust-gas suction, and compression with respect to each cylinder, these operations being in concert with respect to all the cylinders at each quarter-revolution of said shaft, it being understood that the eccentrics P operate to oscillate the gas and air inlet valves $m$, as well as the igniters, and that the cams Q operate in conjunction with the rods $g'$ and bell-cranks $e'$ to unseat the exhaust-valves $c'$, these valves being reseated by the expansion force of the springs surrounding their stems in opposition to the valve-chests. To reverse the motion of the crank-shaft, the clutch-sleeve is moved out of engagement with the miter-wheel with which it has been previously operating and said shaft turned to start in the new direction, after which said clutch-sleeve and the other miter-wheel are engaged. Therefore it will be understood that the desired reverse motion of said shaft is obtained without changing the motion of the valve-gear and igniting mechanisms, this gear and mechanism being always in the same direction, owing to the arrangement of said miter gear-wheels and clutch-sleeve.

While we have shown and particularly described a four-cylinder engine, our improvements are just as applicable in a two-cylinder engine having coupled pistons in connection with a crank-shaft, the organization being such that provision is had for reversing the motion of the crank-shaft without changing the direction of motion on the part of the valve-gear shaft.

Having thus described our invention, what we claim as new, and desire to secure by Letters Patent, is—

1. In a gas-engine, a plurality of cylinders arranged one above another, coupled pistons in the cylinders, a shaft having crank connection with the coupled pistons, valve-gear and igniting mechanism for all said cylinders comprising a shaft, and clutch-controlled gearing in connection with the two shafts organized to permit reversal of the crank-shaft without changing the direction of motion on the part of the other shaft.

2. In a gas-engine, a plurality of cylinders arranged in pairs one above another, means for coupling the pistons in each pair of cylinders, a shaft having crank connection with each pair of coupled pistons, valve-gear and igniting mechanism for all of said cylinders comprising a shaft, and clutch-controlled gearing in connection with the two shafts organized to permit reversal of the crank-shaft without changing direction of motion on the part of the other shaft.

3. In a gas-engine, a plurality of cylinders arranged in pairs one above the other, means for coupling the pistons in each pair of cylinders, a shaft having crank connection with each pair of coupled pistons, valve-gear and igniting mechanism for all said cylinders comprising a shaft, a miter-gear fast on the latter shaft, a pair of similar wheels loose on the crank-shaft in mesh with the former wheel, and a clutch-sleeve splined on said crank-shaft to have engagement with either of the miter gear-wheels thereon.

In testimony that we claim the foregoing we have hereunto set our hands, at Racine, in the county of Racine and State of Wisconsin, in the presence of two witnesses.

PETER ROBERTSON.
CHRIST MATSON.

Witnesses:
   PETER PETERSON,
   CHRIST NIELSEN.